(12) United States Patent
Bech et al.

(10) Patent No.: US 10,160,171 B2
(45) Date of Patent: Dec. 25, 2018

(54) WIND TURBINE BLADES

(71) Applicant: Vestas Wind Systems A/S, Aarhus N. (DK)

(72) Inventors: Anton Bech, Ringkøbing (DK); Christopher Boon, Cowes (GB); Andrew Hedges, London (GB); Anders Greve Bervang, Videbaek (DK)

(73) Assignee: Vestas Wind Systems A/S, Aarhus N. (DK)

( * ) Notice: Subject to any disclaimer, the term of this patent is extended or adjusted under 35 U.S.C. 154(b) by 244 days.

(21) Appl. No.: 15/035,922

(22) PCT Filed: Nov. 10, 2014

(86) PCT No.: PCT/DK2014/050374
§ 371 (c)(1),
(2) Date: May 11, 2016

(87) PCT Pub. No.: WO2015/067280
PCT Pub. Date: May 14, 2015

(65) Prior Publication Data
US 2016/0263843 A1 Sep. 15, 2016

(30) Foreign Application Priority Data

Nov. 11, 2013 (GB) ...................................... 1319858

(51) Int. Cl.
*B29C 70/54* (2006.01)
*B29C 70/36* (2006.01)
(Continued)

(52) U.S. Cl.
CPC .......... *B29C 70/543* (2013.01); *B29C 31/085* (2013.01); *B29C 70/342* (2013.01);
(Continued)

(58) Field of Classification Search
CPC ..... B29C 70/543; B29C 70/36; B29C 70/342; B29C 70/541; B29C 31/085; B29C 70/52;
(Continued)

(56) References Cited

U.S. PATENT DOCUMENTS 8,240,992 B2 * 8/2012 Liebmann ............. B29C 70/086
416/20 R
8,668,800 B2 * 3/2014 Guitton ................... B29C 70/68
156/173
(Continued)

FOREIGN PATENT DOCUMENTS

DE 102010013479 A1 10/2011
EP 2283996 A1 2/2011
(Continued)

OTHER PUBLICATIONS

Intellectual Property Office, Search and Examination Report dated Jun. 24, 2014 in Application No. GB1319858.5.
(Continued)

*Primary Examiner* — Nahida Sultana
(74) *Attorney, Agent, or Firm* — Wood Herron & Evans LLP (57) ABSTRACT

A method of making a wind turbine blade in a blade mould is described. The wind turbine blade comprises a plurality of elongate reinforcing structures each comprising a stack of strips of fibre-reinforced polymeric material, and the method comprises: stacking strips of fibre-reinforced polymeric material to form a plurality of stacks (40), each defining a longitudinal axis; aligning the stacks relative to one another in an alignment zone outside the blade mould; supporting the stacks to maintain their relative alignment; transferring the plurality of stacks into the blade mould simultaneously while maintaining the relative alignment of stacks as the stacks are transferred; and integrating the stacks with other
(Continued)

blade materials forming the blade in the blade mould. An apparatus for use in the method is also described.

10 Claims, 9 Drawing Sheets

(51) Int. Cl.
  *F03D 1/06* (2006.01)
  *B29C 70/34* (2006.01)
  *B29C 31/08* (2006.01)
  *B29D 99/00* (2010.01)
  B29C 70/52 (2006.01)
  B29K 105/08 (2006.01)
  B29K 307/04 (2006.01)
  B29L 31/08 (2006.01)

(52) U.S. Cl.
  CPC .............. *B29C 70/36* (2013.01); *B29C 70/541* (2013.01); *B29D 99/0028* (2013.01); *F03D 1/0675* (2013.01); B29C 70/52 (2013.01); B29K 2105/0872 (2013.01); B29K 2307/04 (2013.01); B29L 2031/085 (2013.01); F05B 2230/21 (2013.01); F05B 2280/4011 (2013.01); F05B 2280/6003 (2013.01); F05B 2280/6015 (2013.01); Y02E 10/721 (2013.01); Y02P 70/523 (2015.11)

(58) Field of Classification Search
  CPC .............. B29C 99/0028; F03D 1/0675; F05B 2230/21; F05B 2280/4011; F05B 2280/6015; F05B 2280/6003; B29K 2105/0872; B29K 2307/04; B29L 2031/085; Y02E 10/721; Y02P 70/523
  See application file for complete search history.

(56) References Cited

U.S. PATENT DOCUMENTS

| | | | |
|---|---|---|---|
| 8,747,592 B2 * | 6/2014 | Stenbaek | B29C 73/10 156/285 |
| 2004/0026025 A1 | 2/2004 | Sana et al. | |
| 2004/0140587 A1 * | 7/2004 | Hadley | B29C 35/0266 264/257 |
| 2008/0159871 A1 * | 7/2008 | Bech | F03D 1/065 416/229 R |
| 2008/0206059 A1 * | 8/2008 | Hancock | F03D 1/0658 416/213 R |
| 2011/0037191 A1 | 2/2011 | Stiesdal | |
| 2012/0093656 A1 | 4/2012 | Esaki et al. | |
| 2013/0062002 A1 * | 3/2013 | Wachendorf | B29C 31/008 156/196 |
| 2014/0178204 A1 * | 6/2014 | Livingston | B29C 70/443 416/230 |
| 2015/0224721 A1 * | 8/2015 | Bendel | B29C 70/342 416/226 |
| 2017/0082088 A1 * | 3/2017 | Yarbrough | F03D 1/0675 |

FOREIGN PATENT DOCUMENTS

| | | |
|---|---|---|
| GB | 2497578 A | 6/2013 |
| WO | 2014079456 A1 | 5/2014 |

OTHER PUBLICATIONS

European Patent office, International Search Report and Written Opinion dated Feb. 5, 2015 in Patent Application No. PCT/DK2014/050374.

* cited by examiner

WIND TURBINE BLADES

FIELD OF THE INVENTION

The present invention relates to wind turbine blades and to methods of manufacturing wind turbine blades. More specifically, the present invention relates to wind turbine blades that include a stack of load-bearing reinforcing strips integrated within the structure of the shell.

BACKGROUND TO THE INVENTION

Figure 1A:
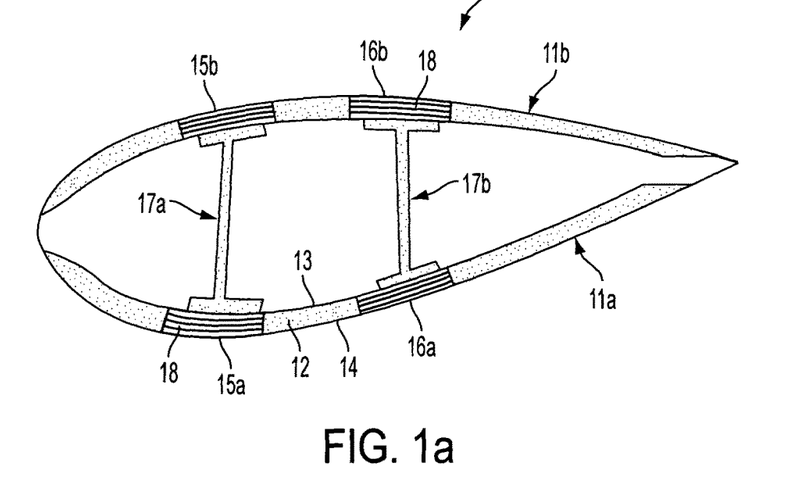

FIG. 1a is a cross-sectional view of a wind turbine rotor blade 10. The blade has an outer shell, which is fabricated from two half shells: a windward shell 11a and a leeward shell 11b. The shells 11a and 11b are moulded from glass-fibre reinforced plastic (GRP). Parts of the outer shell 11 are of sandwich panel construction and comprise a core 12 of lightweight foam (e.g. polyurethane), which is sandwiched between inner 13 and outer 14 GRP layers or 'skins'.

The blade 10 comprises a first pair of spar caps 15a and 15b and a second pair of spar caps 16a, 16b. The respective pairs of spar caps 15a and 15b, 16a and 16b are arranged between sandwich panel regions of the shells 11a and 11b. One spar cap 15a, 16a of each pair is integrated with the windward shell 11a and the other spar cap 15b, 16b of each pair is integrated with the leeward shell 11b. The spar caps of the respective pairs are mutually opposed and extend longitudinally along the length of the blade 10.

A first longitudinally-extending shear web 17a bridges the first pair of spar caps 15a and 15b and a second longitudinally-extending shear web 17b bridges the second pair of spar caps 16a and 16b. The shear webs 17a and 17b in combination with the spar caps 15a and 15b and 16a and 16b form a pair of I-beam structures, which transfer loads effectively from the rotating blade 10 to the hub of the wind turbine. The spar caps 15a and 15b and 16a and 16b in particular transfer tensile and compressive bending loads, whilst the shear webs 17a and 17b transfer shear stresses in the blade 10.

Each spar cap 15a and 15b and 16a and 16b has a substantially rectangular cross section and is made up of a stack of pre-fabricated reinforcing strips 18. The strips 18 are pultruded strips of carbon-fibre reinforced plastic (CFRP), and are substantially flat and of rectangular cross section. The number of strips 18 in the stack depends upon the thickness of the strips 18 and the required thickness of the shells 11a and 11b, but typically the strips 18 each have a thickness of a few millimeters and there may be between three and twelve strips in the stack. The strips 18 have a high tensile strength, and hence have a high load bearing capacity.

Figure 1B:
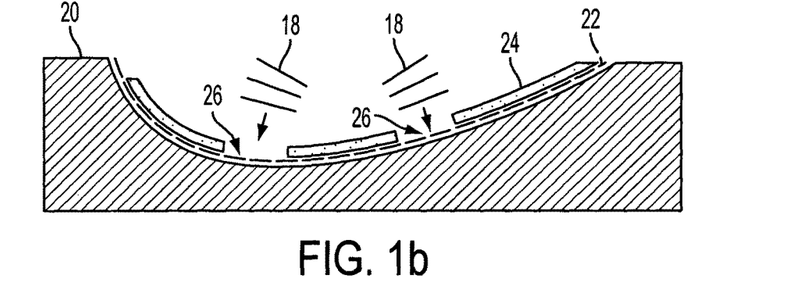
Figure 1C:
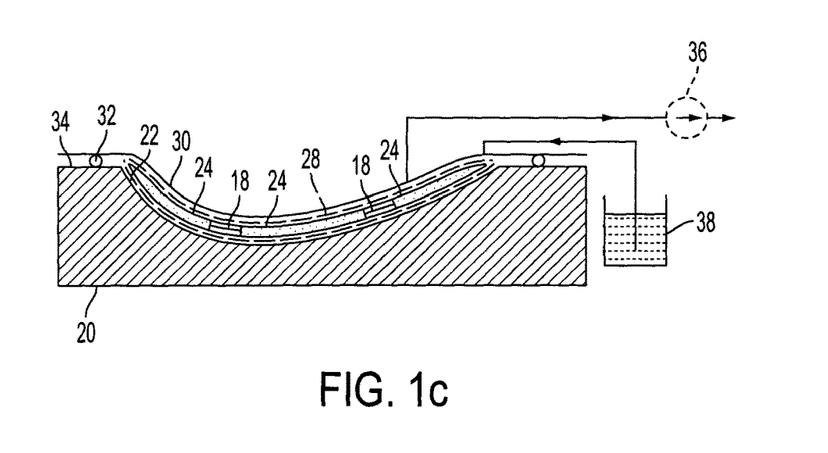

The blade 10 is made using a resin-infusion process as will now be described by way of example with reference to FIGS. 1b and 1c. Referring to FIG. 1c, this shows a mould 20 for a half shell of a wind turbine blade in cross-section. A glass-fibre layer 22 is arranged in the mould 20 to form the outer skin 14 of the blade 10. Three elongate panels 24 of polyurethane foam are arranged on top of the glass-fibre layer 22 to form the sandwich panel cores 12 referred to above. The foam panels 24 are spaced apart relative to one another to define a pair of channels 26 in between. A plurality of pultruded strips 18 of CFRP, as described above with reference to FIG. 1a, are stacked in the respective channels 26. Three strips 18 are shown in each stack in this example, but there may be any number of strips 18 in a stack.

Referring to FIG. 1c, once the strips 18 have been stacked, a second glass-fibre layer 28 is arranged on top of the foam panels 24 and the stacks of pultruded strips 18. The second glass-fibre layer 28 forms the inner skin 13 of the blade 10. Next, vacuum bagging film 30 is placed over the mould 20 to cover the layup. Sealing tape 32 is used to seal the vacuum bagging film 30 to a flange 34 of the mould 20. A vacuum pump 36 is used to withdraw air from the sealed region between the mould 20 and the vacuum bagging film 30, and resin 38 is supplied to the sealed region. The resin 38 infuses between the various laminate layers and fills any gaps in the laminate layup. Once sufficient resin 38 has been supplied to the mould 20, the mould 20 is heated whilst the vacuum is maintained to cure the resin 38 and bond the various layers together to form the half shell of the blade. The other half shell is made according to an identical process. Adhesive is then applied along the leading and trailing edges of the shells and the shells are bonded together to form the complete blade.

The integration of the spar caps 15a and 15b and 16a and 16b within the structure of the outer shells 11a and 11b avoids the need for a separate spar cap such as a reinforcing beam, which is typically bonded to an inner surface of the shell in many conventional wind turbine blades. Other examples of rotor blades having spar caps integral with the shell are described in EP 1 520 983, WO 2006/082479 and UK Patent Application GB 2497578.

The CFRP pultruded strips 18 extend along the majority of the length of the wind turbine blade 10. Modern wind turbine blades may be in excess of eighty meters long, and so it will be appreciated that these strips are very long and heavy. The length and weight of the strips presents challenges relating to the manufacture of the blades, and relating to the handling and transportation of the strips. The present invention aims to address these challenges by providing a convenient method of manufacturing this type of wind turbine blade, and by providing apparatus for use in the method.

SUMMARY OF THE INVENTION

Against this background, and from a first aspect, the invention resides in a method of making a wind turbine blade in a blade mould, the wind turbine blade comprising a plurality of elongate reinforcing structures each comprising a stack of strips of fibre-reinforced polymeric material. The method comprises: stacking strips of fibre-reinforced polymeric material to form a plurality of stacks, each defining a longitudinal axis; aligning the stacks relative to one another in an alignment zone outside the blade mould; supporting the stacks to maintain their relative alignment; transferring the plurality of stacks into the blade mould simultaneously while maintaining the relative alignment of stacks as the stacks are transferred; and integrating the stacks with other blade materials forming the blade in the blade mould.

The method according to the invention allows stacks of strips to be arranged in a required alignment outside of a blade mould, and then to be transferred into the mould with the alignment maintained, so that little, if any, alignment is required in the blade mould itself. Alignment can therefore take place outside of the mould, where there is a relatively large amount of space and hence where alignment of the stacks is easier, rather than inside the mould, where there is relatively little space, and hence where alignment is more difficult. In this way, the alignment of the stacks requires less time and less manual input.

The relative alignment of the stacks in the alignment zone may correspond to the required alignment of the stacks in the finished blade. In this case, no realignment of the stacks is required once the stacks have been transferred to the blade mould.

The method may further comprise positioning the stacks in the alignment zone such that the stacks are spaced apart from one another by a predetermined separation distance and may further comprise maintaining the predetermined separation distance between the stacks as the stacks are transferred into the mould. The predetermined separation distance may correspond to the required separation between the stacks in the finished blade. The predetermined separation distance may be selected to accommodate blade components between the stacks once the stacks are in the mould. For example, the predetermined separation distance may be selected to accommodate a foam panel between the stacks.

The method may comprise coupling a support structure to each stack in the alignment zone, the support structure being configured to maintain the relative alignment of the stacks as the stacks are transferred into the mould. The support structure provides a simple means of maintaining the relative alignment during transfer that can be easily coupled to the stacks.

To provide particular stability during transfer of the stacks, the method may comprise coupling the support structure to respective end regions of each stack.

For ease of coupling the support structure to the stacks, the method may comprise clamping the support structure to each stack.

The method may also comprise decoupling the support structure from the stacks after the stacks have been transferred to the mould.

The method may comprise lifting the plurality of stacks from the alignment zone and lowering the plurality of stacks into the blade mould. In this way, the stacks can be transferred to the mould particularly quickly and easily, requiring relatively little movement of the stacks.

For additional support during lifting, the method may comprise supporting the stacks during the lifting process by means of a plurality of strops arranged at intervals along the length of the stacks.

The method may comprise primarily supporting the stacks at their respective end regions so that when the stacks are lifted, the stacks droop such that a central portion of each stack is below the end regions of the stack, and lowering the stacks into the blade mould such that the central regions of the stacks make contact with the blade mould before the end regions. This allows the central regions of the stacks to make contact with the mould first, which guards against damage to the end regions of the stacks, which are more susceptible to damage than the central region.

The method may comprise integrating the stacks with other blade materials in the blade mould by means of a resin infusion process.

The invention also extends to a wind turbine blade made according to the method described above, and to a wind turbine comprising such a wind turbine blade.

From another aspect, the invention resides in apparatus for simultaneously transferring a plurality of stacks of strips of fibre-reinforced polymeric material into a blade mould, the plurality of stacks being pre-aligned relative to one another in an alignment zone outside the blade mould before being transferred into the blade mould. The apparatus comprises: a support structure for attaching to the stacks; and a lifting device for attaching to the support structure, the lifting device being configured to lift and move the support structure so as to transfer the stacks from the alignment zone into the blade mould, wherein the support structure is configured to maintain the relative alignment of the plurality of stacks whilst the stacks are lifted and transferred into the blade mould.

In this way, the invention provides apparatus that allows stacks of strips to be transferred to a blade mould whilst maintaining alignment between the stacks during the transfer process, so that little or no re-alignment is required once the stacks are in the blade mould.

The support structure may be configured to maintain a predefined separation distance between the stacks as the stacks are lifted and transferred into the mould. For example, the predetermined distance may be selected to accommodate other blade materials, such as a foam panel.

The support structure may further comprise first and second transverse beams to which the stacks are attached, and the transverse beams may maintain the predetermined spacing between the stacks as the stacks are lifted and transferred into the mould. The transverse beams provide a simple means of maintaining the predetermined spacing between the stacks.

The support structure may further comprise a longitudinal beam and the first and second transverse beams may be suspended from respective first and second end regions of the longitudinal beam.

The apparatus may comprise brackets for attaching the plurality of stacks to the support structure. The brackets may comprise clamps for clamping around the stacks. This provides a particularly secure means for attaching the stacks to the support structure, whilst minimising damage to the stacks.

The brackets may be coupled to the transverse beams and the brackets may be spaced apart along a transverse beam by the predetermined spacing distance. The transverse beams may each be suspended from a respective mounting point on the longitudinal beam, and, in use, the brackets may be attached to the stacks at locations along the stacks such that the longitudinal separation between the mounting points is greater than the longitudinal separation between the respective transverse beams. In this way, the each transverse beam may be disposed inwardly of its respective mounting point on the longitudinal beam, which reduces longitudinal movement of the stacks during transfer.

The apparatus may further comprise a plurality of strops spaced at intervals along the support structure for supporting the stacks when the stacks are lifted and transferred into the mould. The strops provide additional support for the stacks, and also guide placement of the stacks into the mould when the apparatus is in use.

It will be appreciated that preferred and/or optional features of one aspect of the invention may apply, alone or in appropriate combination, to the other aspect of the invention also.

BRIEF DESCRIPTION OF THE DRAWINGS

FIGS. 1a to 1c have already been described above by way of background to the invention. In order that embodiments of the invention might be more readily understood, reference will now be made, by way of example only, to the accompanying drawings, in which:

DETAILED DESCRIPTION OF EMBODIMENTS OF THE INVENTION

Figure 2:
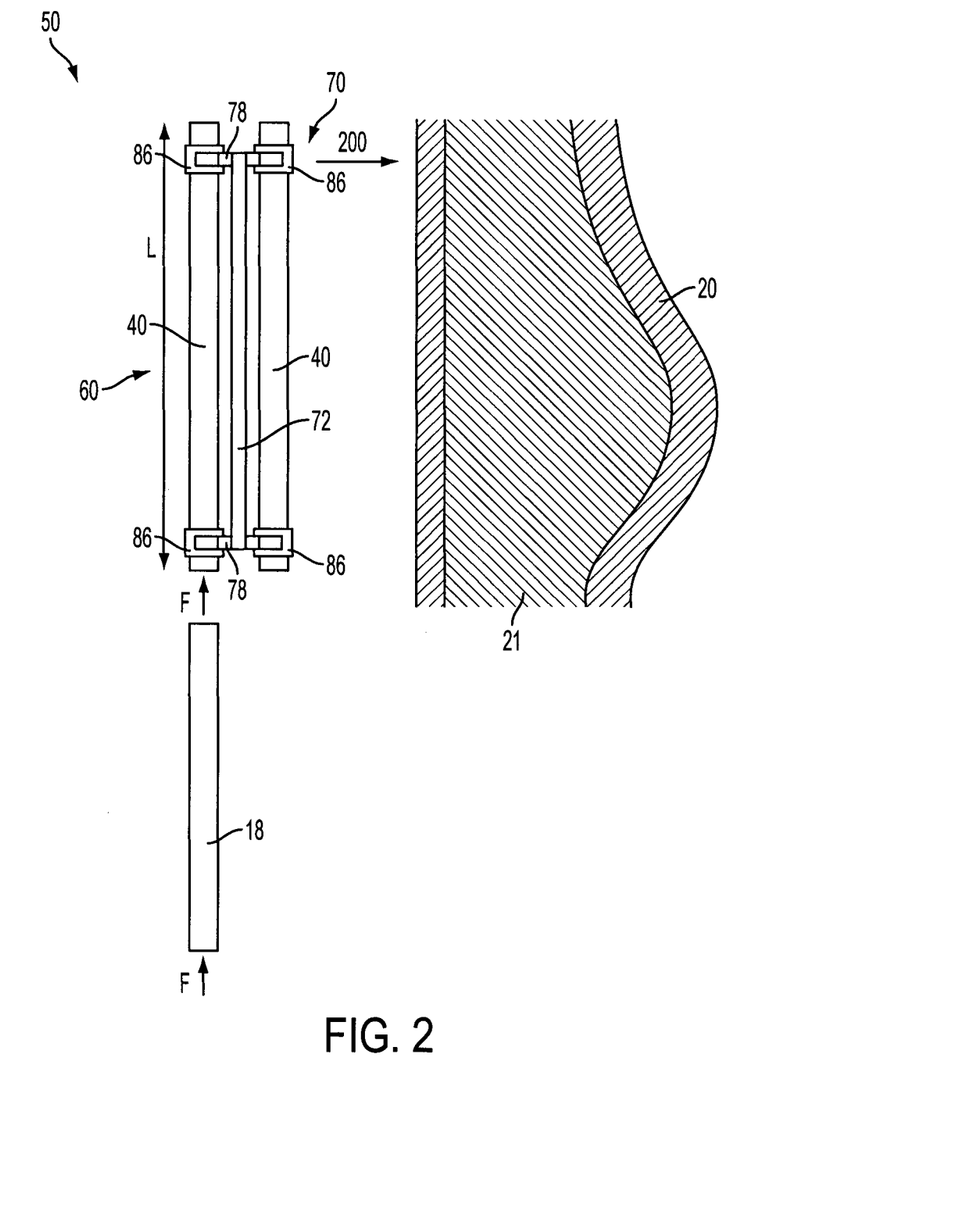
FIG. 2 is a schematic plan view of apparatus for making a wind turbine blade.

FIG. 2 illustrates an apparatus 50 according to the present invention used in the manufacture of wind turbine blades 10 of the type described above by way of introduction to the present invention. More specifically, the apparatus 50 is used for making wind turbine blades comprising spar caps that extend along a longitudinal axis L, and that comprise a plurality of strips 18 of fibre reinforced polymeric material arranged one on top of another in a stack.

Referring to FIG. 2, the apparatus 50 comprises an alignment zone, generally indicated at 60, which is defined on the factory floor adjacent a wind turbine blade mould 20.

Pultruded strips 18 made from carbon-fibre reinforced plastic (CFRP) are fed to the alignment zone 60 from a down-stream strip manufacturing station or strip feed station (not shown) in a feed direction F. At the alignment zone 60, the strips 18 are stacked up to form two stacks 40 that will later form spar caps 15a, 15b, 16a, 16b. The stacks 40 are arranged side-by-side and are aligned relative to one another in the configuration that they will adopt in the finished wind turbine blade 10. Once aligned, the stacks 40 are supported in that configuration by a support structure 70. The stacks 60 are lifted using the support structure 70 from the alignment zone 60 and transferred to a blade mould 20 in a transfer direction 200, and then lowered onto a surface 21 of the mould 20. During the transfer, the support structure 70 maintains the configuration of the stacks 40, such that no, or relatively little, further alignment is required once the stacks 40 have been lowered into the mould 20.

The support structure 70 will now be described in further detail, with reference to FIGS. 3 to 5 and FIGS. 6a and 6b.

Figure 3:
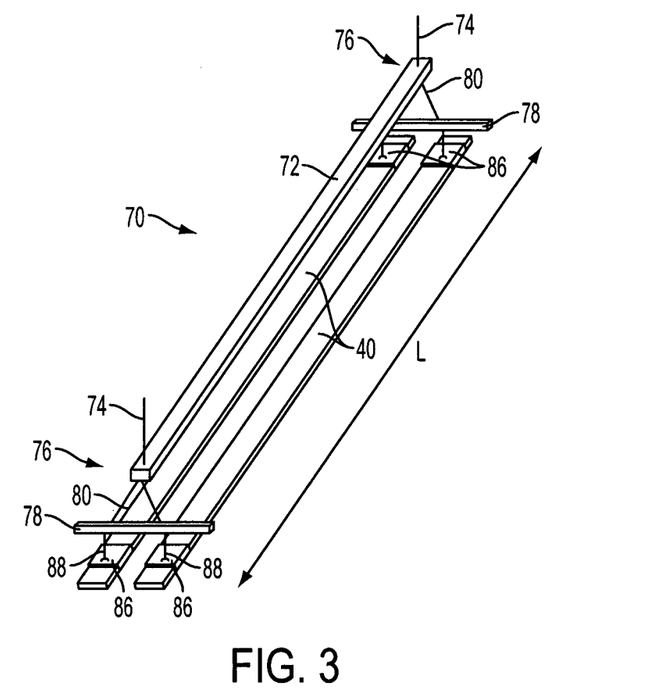
FIG. 3 is a perspective view of a support structure forming part of the apparatus of FIG. 2 in use in supporting two stacks of strips.

As best seen in FIG. 3, the support structure 70 comprises a longitudinal beam 72 that extends parallel to the longitudinal axis L of each stack 40. The beam 72 is suspended from a lifting means such as a crane (not shown) by a pair of cables 74 attached to the respective ends 76 of the beam 72.

Figure 4:
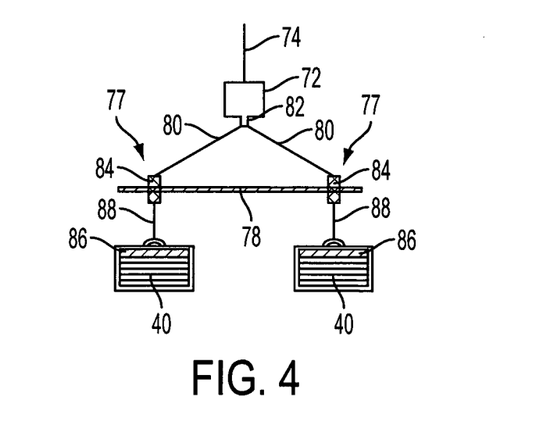
FIG. 4 is an end view of the support structure of FIG. 3.

First and second transverse beams 78 are suspended respectively from the respective ends 76 of the longitudinal beam 72. Each transverse beam 78 is suspended by a respective pair of cables 80. As best seen in FIG. 4, and considering one of the transverse beams 78, a lower end of each cable 80 in a pair is fixed to a fixing point 84 at a respective end 77 of the transverse beam 78 whilst an upper end of each cable 80 in the pair is connected to a common fixing point 82 at the end 76 of the longitudinal beam 72. The suspension arrangement of the other transverse beam 78 at the other end of the longitudinal beam 72 is substantially identical.

Figure 5:
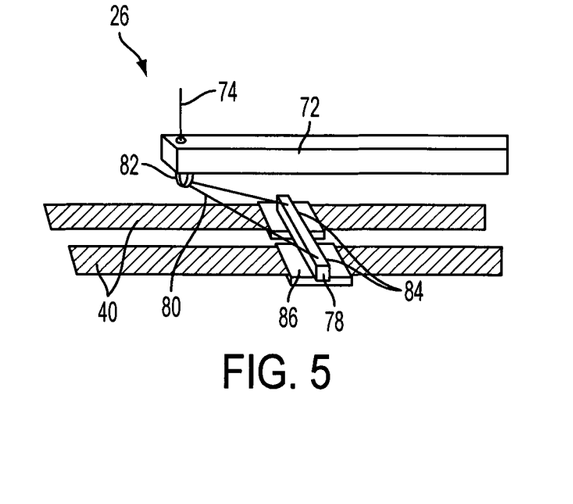
FIG. 5 is a side perspective view of an end region of the support structure of FIG. 3.

FIG. 5 illustrates the relative positions of the fixing points 82, 84 at one end of the support structure 70. The arrangement at the other end of the support structure 70 is a mirror image of this arrangement. FIG. 5 reveals that the common fixing points 82 on the longitudinal beam 72 are not located directly above the corresponding fixing points 84 on the transverse beams 78. Instead, the longitudinal distance between the respective common fixing points 82 is greater than the longitudinal distance between the respective transverse beams 78, such that the cables 80 extend inwardly (in the longitudinal direction) from the longitudinal beam 74 to the transverse beam 78. This suspension arrangement serves to minimise the movement of the stacks 40 in the longitudinal direction during transfer by reducing the ability of the transverse beams 78 to swing back and forth on the cables 80.

Figure 6A:
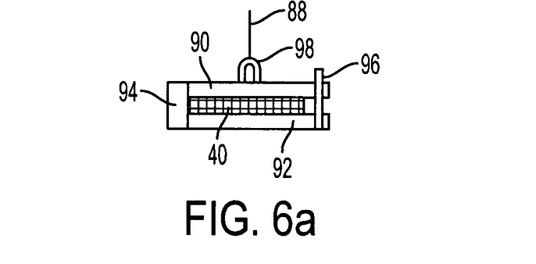
FIG. 6a is a cross-sectional view of a clamping bracket forming part of the support structure of FIG. 3.

Referring again to FIG. 4, first and second brackets 86, which in this example are in the form of clamps, are attached respectively to the ends 77 of the transverse beams 78. Each clamp 86 is suspended directly beneath a respective end 77 of the transverse beam 78 by a respective clamp cable 88. The clamps 86 are the primary load-bearing elements of the support structure 70, and bear the load of the stacks 40 during lifting. Referring to FIG. 6a, each clamp 86 comprises upper and lower plates 90, 92 joined at one edge by a sidewall 94, to form a structure that is C-shaped in cross-section. The plates 90, 92 and side wall 94 embrace the stack 40 from one side, and the plates 90, 92 are held together on the other side of the stack 40 by a bolt 96 or other suitable fixing means. The clamps 86 ensure that the strips in the stacks are held firmly together and prevent the strips sliding or otherwise moving relative to one another. The upper plate 90 is provided with a hook 98 or other attachment means, for easy attachment to the cables 88.

A method of making a wind turbine blade using the support structure 70 will now be described, with particular reference to FIGS. 7 to 11, 12a and 12b and 13a and 13b.

Figure 6B:
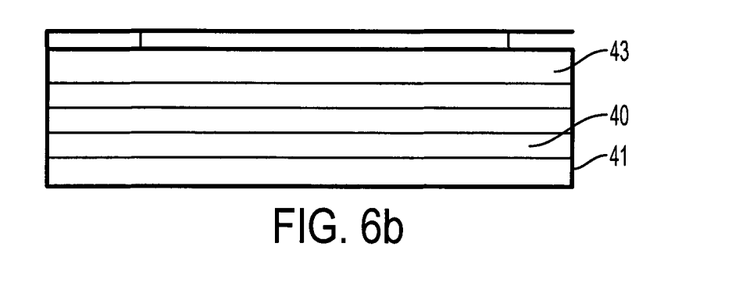
FIG. 6b is a cross-sectional view of a strap in use in securing a stack of strips

A plurality of strips 18 are stacked one on top of another to form two separate stacks 40. The stacks 40 are strapped together using plastic straps 41. A detailed view of the strapping arrangement is shown in FIG. 6b. A block made from wood or another suitable material that has the same width as the stack 40 is placed on top of the stack 40. The strap 41 is wrapped around the stack 40 and the block 43. Edges of the strap 41 overlap one another and are bonded to one another by an adhesive, so as to secure the strap in place. Straps 41 are fitted to the stack 40 at regular intervals along the stack 40, so as to maintain the strips 18 in the correct position in the stack 40.

Figure 7:
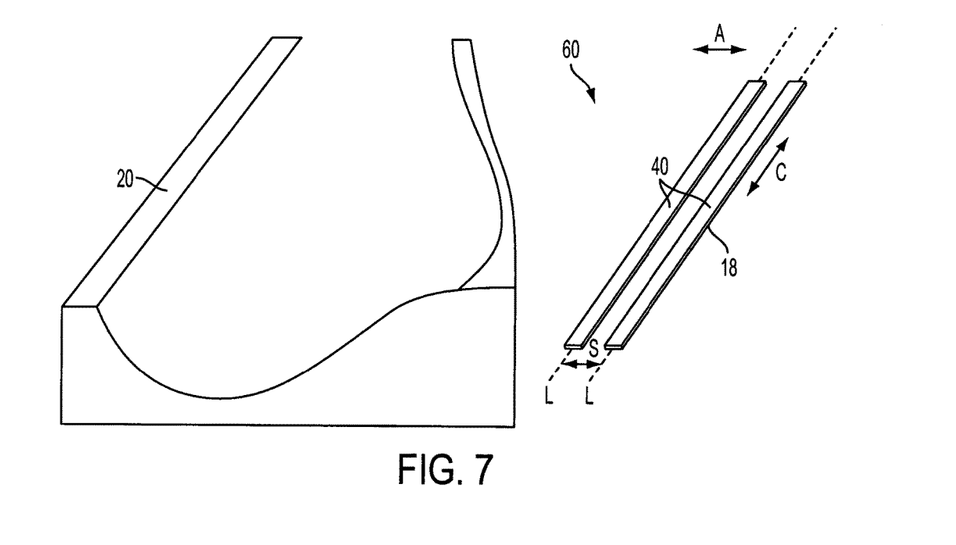
FIGS. 7 to 11, 12a and 13a are perspective views of the apparatus of FIGS. 3 to 6 at different stages in use in the process of making a wind turbine blade.

Referring to FIG. 7, once the straps have been fitted to each stack 40, the stacks 40 are arranged side-by-side in an alignment zone 60 defined on the factory floor adjacent a wind turbine blade mould 20. As will be described in further detail below, the stacks 40 are aligned relative to one another in the alignment zone 60 in a configuration that matches the eventual configuration of the spar caps 15a, 15b, 16a, 16b in the finished blade 10.

In the alignment zone 60, the stacks 40 are positioned relative to one another so that their relative orientations correspond almost exactly to their relative orientations in the wind turbine blade mould 20. In this example, the relevant alignment parameters include:

(i) the transverse separation between respective stacks 40, as indicated by reference s on FIG. 7; (ii) the relative orientation of the respective longitudinal axes L of the respective stacks 40—in FIG. 7 the respective longitudinal axes L are parallel to one another; and (iii) the relative positions of the stacks 40 in the longitudinal direction—in FIG. 7 the stacks 40 are arranged such that the corresponding ends of the respective stacks 40 are aligned in the longitudinal direction; in other examples the corresponding ends of the respective stacks 40 could be offset in the longitudinal direction.

Thus, the required stack configuration is a pre-determined combination of the transverse spacing distance s between the stacks 40, the relative orientations of the longitudinal axes L of the stacks 40, and the relative position of the stacks 40 along the longitudinal axes L.

The stacks 40 are then supported in this configuration by the support structure 70 as will now be described.

Figure 8:
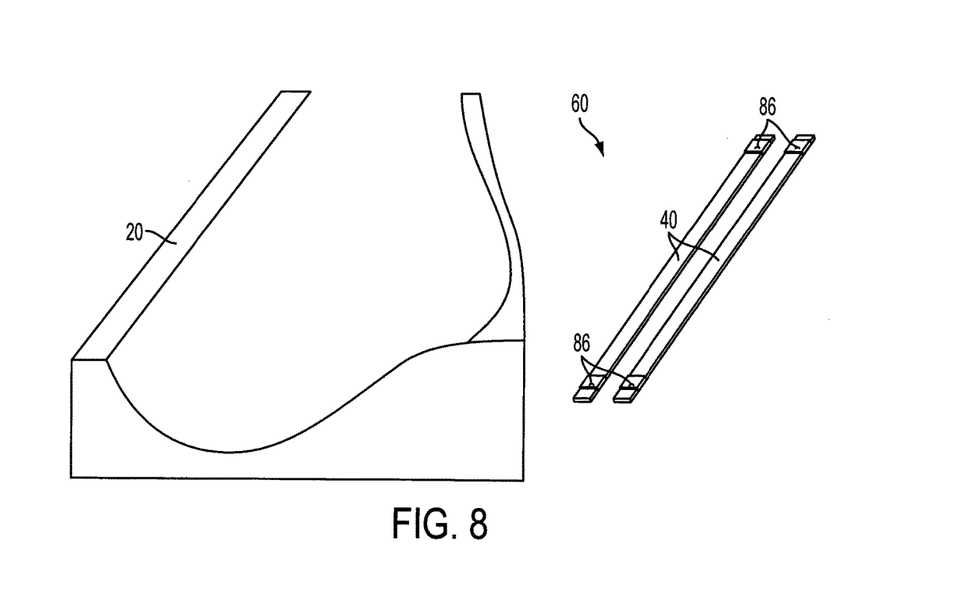
Figure 9:
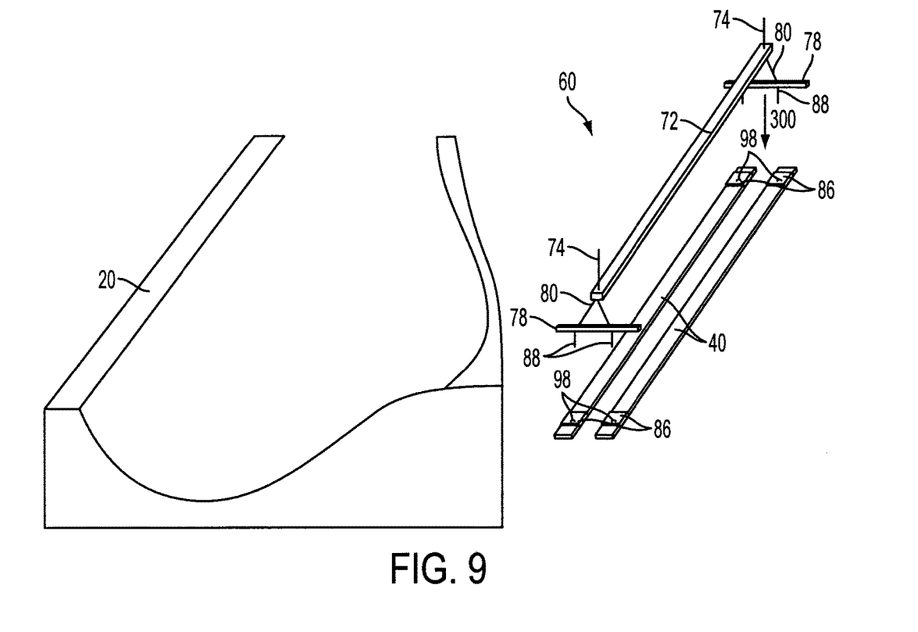

To couple the stacks 40 to the support structure 70, the clamps 86 are firstly clamped around each end of a respective stack 60, as shown in FIG. 8. Referring also again to FIG. 6a, the upper and lower plates 90, 92 and the sidewall 94 of the clamp 86 are fitted around the stack 40, and the plates 90, 92 are clamped together by the bolt 96. Next, as shown in FIG. 9, the longitudinal beam 72, transverse beams 78 and cables 74, 80, 88 are lowered into place above the stacks 40 as indicated by the arrow 300. The clamp cables 88 are attached to the respective clamps 86 by means of the hook 98 (FIG. 6a), and the stacks 40 are then ready for transfer to the mould 20.

Figure 10:
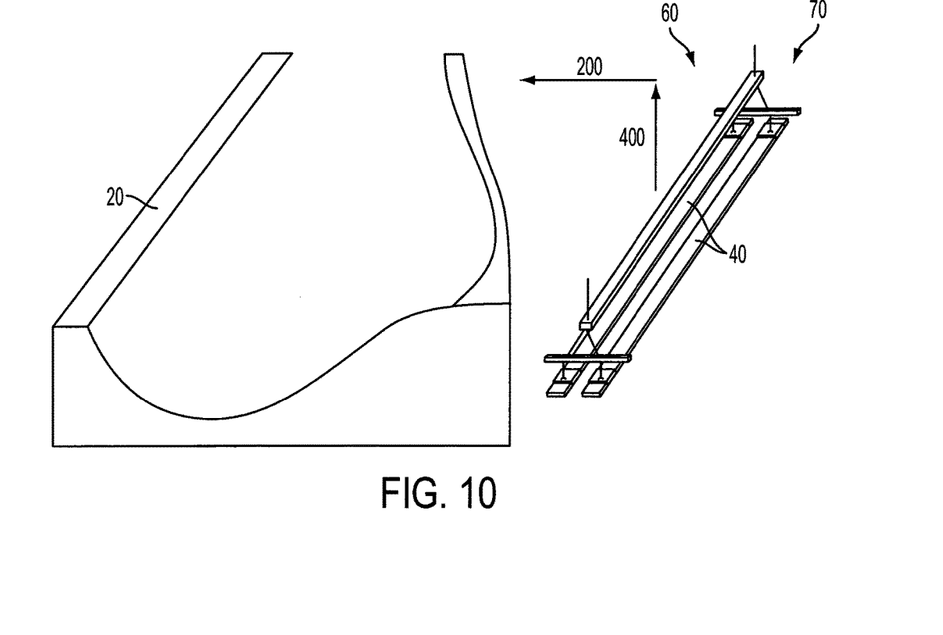
Figure 11:
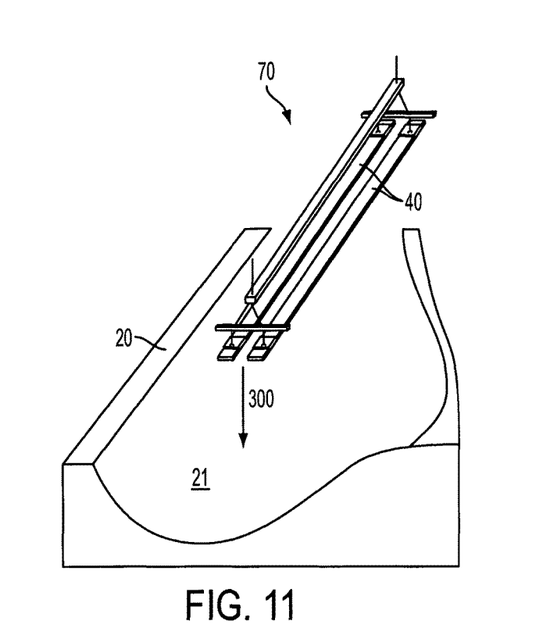

To transfer the stacks 40 to the mould 20, as shown in FIG. 10, the support structure 70 is lifted up by the crane (not shown) in a lifting direction 400, and moved laterally towards the blade mould 20 in a transfer direction 200, until the stacks 40 are generally above their required position in the blade mould 20 (see FIG. 11).

Figure 12A:
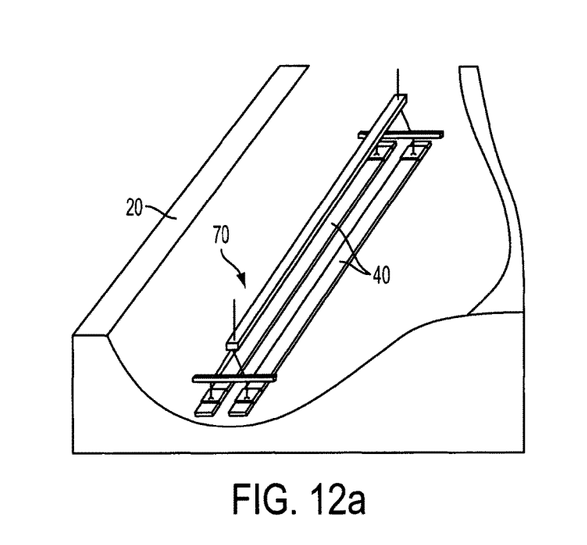

Referring to FIG. 11, the support structure 70 is then lowered towards the mould surface 21 as represented by the arrow 300, until the stacks 40 are arranged in the mould 20, as shown in FIG. 12a.

Figure 12B:
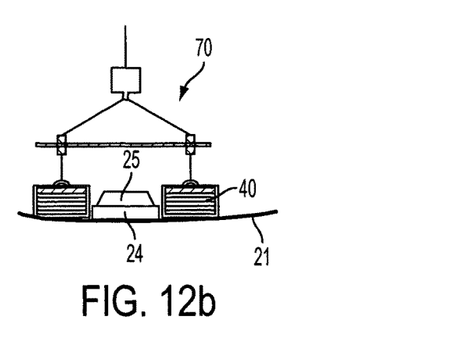
FIGS. 12b and 13b are end views of FIGS. 12a and 13a respectively.

As best seen in FIG. 12b, the support structure 70 and the attached stacks 40 are lowered into the blade mould 20 such that the stacks 40 are located each side of a foam panel region 24. The foam panel regions 24 eventually form sandwich panel cores in the blade shell structure.

FIG. 12b also illustrates that a positioning block 25 is arranged over the foam panel region 24. In practice a plurality of positioning blocks are spaced at intervals along the length of the foam panel region 24. The positioning blocks 25 are removable wooden blocks in the shape of a trapezium, which each have a width slightly greater than the width of the foam panel 24 and inclined side walls. The positioning blocks 25 shield the foam panel 24 from the stacks 40 as they are lowered into the mould 20 so as to avoid damage to the foam panel region 24. The inclined sidewalls of the blocks 25 serve to guide the stacks 40 to the sides of the foam panel 24 as the stacks 40 are lowered into place.

During the transfer process, the support structure 70 maintains the relative alignment of the stacks 40 that was defined in the alignment zone 60 outside the blade mould 20. The transverse beams 78 maintain the spacing distance s between the stacks 40 and maintain the relative orientation of the respective longitudinal axes L of the stacks 40. The longitudinal beam 72 maintains the position of the stacks 40 relative to one another along the longitudinal axis. In this way, as the stacks 40 are transferred to the blade mould 20, the relative positions and orientations of the stacks 40 remain fixed. The stacks 40 are therefore pre-aligned before being transferred into the mould 20 so that little, if any, further alignment of the stacks 40 is required once the stacks 40 have been placed in the mould 20.

Figure 13A:
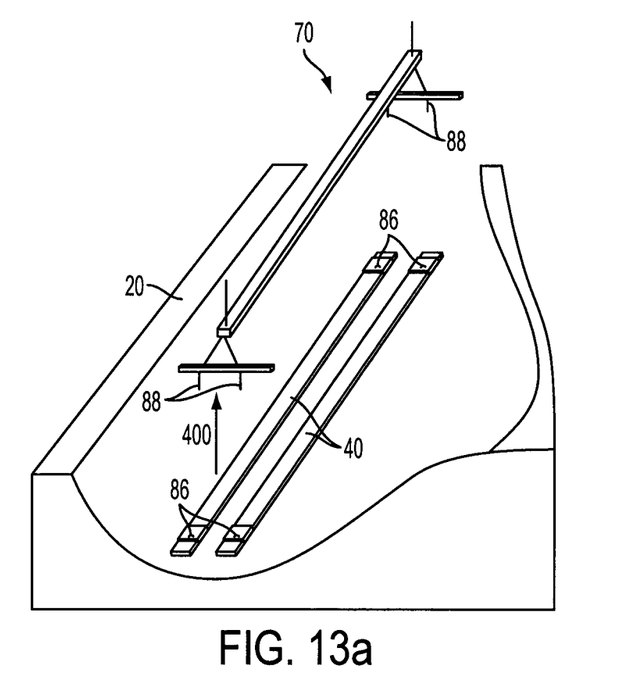
Figure 13B:
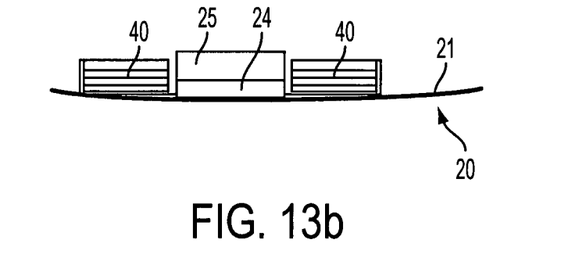

Referring to FIG. 13a, once the stacks 40 have been positioned in the mould 20, the clamps 86 are detached from the clamp cables 88, and the remainder of the support structure 70 is lifted upwards in the lifting direction 400 and moved away from the blade mould 20, to be stored for use in supporting and transferring further stacks 40. The clamps 86 are then removed from the stacks 40. As best seen in FIG. 13b, once the clamps 86 have been removed, the stacks 40 are in place in the blade mould 20 on each side of the foam panel regions 24 in the required configuration and ready for integration into the blade 10.

Next, other components of the blade 10 are added to the blade mould 20 as required. The components are infused with resin using the resin-infusion process described above, and the resin is cured. Once cured, the stacks 40 form the spar caps 15a, 15b, 15c, 15d of the blade 10.

Figure 14A:
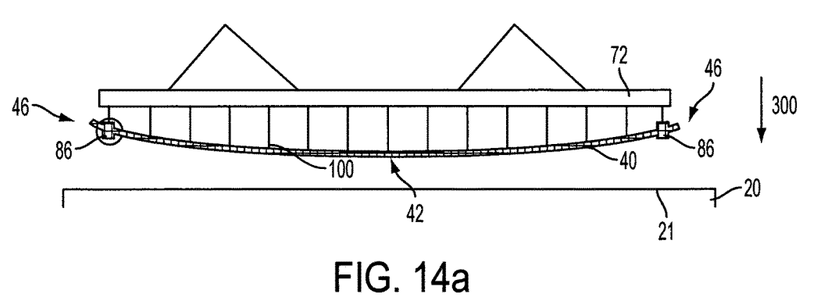
FIGS. 14a to 14d are side views of another support structure in use in making a wind turbine blade.
Figure 14B:
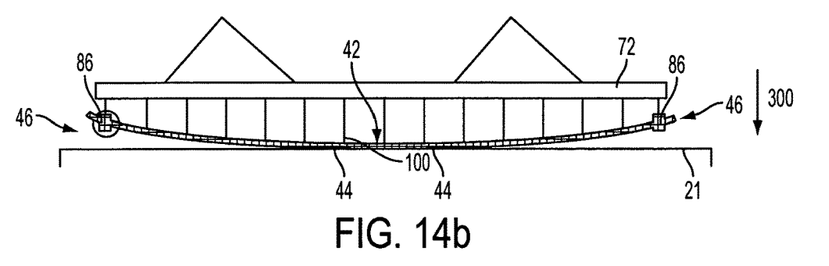
Figure 14C:
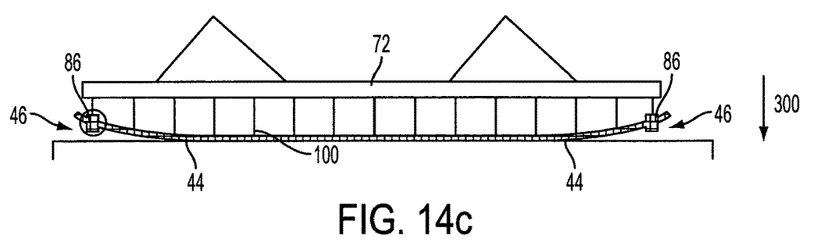
Figure 14D:
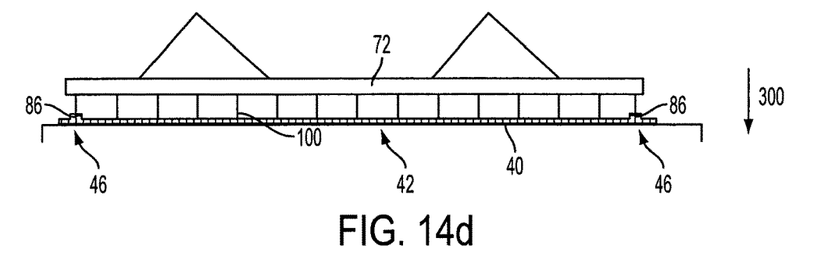
Figure 14E:
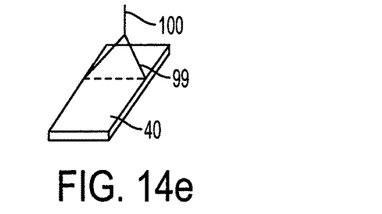
FIG. 14e is a perspective view of a strop forming part of the support structure of FIGS. 14a to 14d.

In one embodiment of the invention, illustrated in FIGS. 14a to 14e, the stacks 40 are allowed to droop at their centres 42 during the lifting process, such that a longitudinal curvature is developed in the stacks 40 as shown in the figures. In this case, as illustrated in FIG. 14e, strops 99 are attached along the length of the stack 40 and are attached to the longitudinal beam 72 by strop cables 100. The strops 99 are spaced at intervals along the length of the stacks 40. The strop cables 100 are of varying length to accommodate the droop developed in the stacks 40, and hence the strop cables 100 are longer near the centre 42 of the stacks 40 than near the ends 46 of the stacks 40. The strops 99 do not act as load-bearing components, since this function is carried out by the clamps 86 and clamp cables 88, but instead the strops 99 merely act to control the droop of the stacks 40.

As the stacks 40 are lowered into the mould 20 (FIG. 14a), the drooping central portion 42 of each stack 40 makes contact with the mould surface 21 first (FIG. 14b). As lowering continues, leading points of contact 44 between the stacks 40 and the mould surface 21 move outwardly towards the ends 46 of the stacks 40, as shown in FIG. 14c. Eventually, the stack 40 is lowered such that the entire stack 40, including the ends 46, are in contact with the mould surface 21, as shown in FIG. 14d.

This method of lowering the stacks 40 into the mould 20 is particularly advantageous because the ends 46 of the stacks 40 are particularly susceptible to damage during handling, and lowering the stacks 40 such that the central region 42 makes contact with the mould surface 21 first reduces impact forces on the ends 46 of the stacks 40, and hence reduces the risk of damage to the ends 46.

Although in the embodiments described above two stacks of strips are aligned and transferred into the mould, any number of stacks may be transferred simultaneously. In particular, three, four, five or six stacks may be transferred.

In some embodiments, a single spar cap may be formed from more than one stack of strips. In this case, the stacks that form the spar cap are arranged side-by-side, and are strapped together by a single strap. This arrangement is useful for creating wider spar caps. A single wooden block may be used in the strapping arrangement, which has a width equal to the total width of the stacks that form the spar cap.

In the embodiments described above, plastic straps are described for holding the stacks in place whilst the stacks are lifted and positioned in the mould. The plastic straps are removed once the stacks have been arranged in place and before the stacks are infused with resin. However, in other embodiments on the invention infusible straps may be employed to hold the stacks together, for example straps made from glass-fibre material. In such cases, the infusible straps can remain in place when the stacks are infused such that the straps are also infused together with the stacks. The straps thereby become an integral component of the elongate reinforcing structure.

The required stack configuration may be any suitable configuration. It need not necessarily be the final configuration that the stacks will adopt when integrated into the blade. For example, the required configuration may be a configuration that can be easily re-adjusted to give the final configuration of the stacks in the blade mould.

The support mechanism need not be fixed to the stacks by clamps, but may be fixed to the stacks using any suitable means.

The present invention is therefore not limited to the exemplary embodiments described above and many other variations or modifications will be apparent to the skilled person without departing from the scope of the present invention as defined in the following claims.

The invention claimed is:

1. A method of making a wind turbine blade in a blade mould, the wind turbine blade comprising a plurality of elongate reinforcing structures each comprising a stack of strips of fibre-reinforced polymeric material, and the method comprising:
   stacking strips of fibre-reinforced polymeric material to form a plurality of stacks, each defining a longitudinal axis;
   aligning the plurality of stacks relative to one another in an alignment zone outside the blade mould;
   supporting the plurality of stacks to maintain their relative alignment;
   transferring the plurality of stacks into the blade mould simultaneously while maintaining the relative alignment of the plurality of stacks as the plurality of stacks are transferred; and
   integrating the plurality of stacks with other blade materials forming the blade in the blade mould,
   wherein transferring the plurality of stacks further comprises lifting the plurality of stacks from the alignment zone and lowering the plurality of stacks into the blade mould, and wherein the method further comprises supporting the plurality of stacks during the lifting process by means of a plurality of strops arranged at intervals along the length of the plurality of stacks.

2. The method of claim 1, wherein the relative alignment of the plurality of stacks in the alignment zone corresponds to the required alignment of the plurality of stacks in the finished blade.

3. The method of claim 1, further comprising positioning the plurality of stacks in the alignment zone such that the stacks of the plurality of stacks are spaced apart from one another by a predetermined separation distance and the method further comprising maintaining the predetermined separation distance between the stacks of the plurality of stacks as the plurality of stacks are transferred into the mould.

4. The method of claim 3, wherein the predetermined separation distance corresponds to the required separation between the plurality of stacks in the finished blade.

5. The method of claim 1, comprising coupling a support structure to each stack of the plurality of stacks in the alignment zone, the support structure being configured to maintain the relative alignment of the plurality of stacks as the plurality of stacks are transferred into the mould.

6. The method of claim 5, comprising coupling the support structure to respective end regions of each stack of the plurality of stacks.

7. The method of claim 5, comprising clamping the support structure to each stack of the plurality of stacks.

8. The method of claim 5, comprising decoupling the support structure from each stack of the plurality of stacks after the plurality of stacks have been transferred to the mould.

9. A method of making a wind turbine blade in a blade mould, the wind turbine blade comprising a plurality of elongate reinforcing structures each comprising a stack of strips of fibre-reinforced polymeric material, and the method comprising:
   stacking strips of fibre-reinforced polymeric material to form a plurality of stacks, each defining a longitudinal axis;
   aligning the plurality of stacks relative to one another in an alignment zone outside the blade mould;
   supporting the plurality of stacks to maintain their relative alignment;
   transferring the plurality of stacks into the blade mould simultaneously while maintaining the relative alignment of the plurality of stacks as the plurality of stacks are transferred; and
   integrating the plurality of stacks with other blade materials forming the blade in the blade mould,
   wherein transferring the plurality of stacks further comprises lifting the plurality of stacks from the alignment zone and lowering the plurality of stacks into the blade mould, and wherein the method further comprises primarily supporting the plurality of stacks at their respective end regions so that when the plurality of stacks are lifted, the plurality of stacks droop such that a central portion of each stack is below the end regions of the respective stack, and lowering the plurality of stacks into the blade mould such that the central region of each stack makes contact with the blade mould before the end regions of the respective stack.

10. The method of claim 1, comprising integrating the plurality of stacks with other blade materials in the blade mould by means of a resin infusion process.

* * * * *